(12) United States Patent
Abhishek et al.

(10) Patent No.: US 11,962,867 B2
(45) Date of Patent: Apr. 16, 2024

(54) ASSET REUSABILITY FOR LIGHTFIELD/HOLOGRAPHIC MEDIA

(71) Applicant: Tencent America LLC, Palo Alto, CA (US)

(72) Inventors: Rohit Abhishek, San Jose, CA (US); Arianne Hinds, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 49 days.

(21) Appl. No.: 17/970,035

(22) Filed: Oct. 20, 2022

(65) Prior Publication Data

US 2023/0132420 A1    May 4, 2023

Related U.S. Application Data

(60) Provisional application No. 63/275,789, filed on Nov. 4, 2021.

(51) Int. Cl.
| | | |
|---|---|---|
| *H04N 21/6332* | (2011.01) | |
| *H04N 21/24* | (2011.01) | |
| *H04N 21/44* | (2011.01) | |
| *H04N 21/81* | (2011.01) | |

(52) U.S. Cl.
CPC ..... *H04N 21/6332* (2013.01); *H04N 21/2402* (2013.01); *H04N 21/44004* (2013.01); *H04N 21/816* (2013.01)

(58) Field of Classification Search
CPC ........... H04N 21/6332; H04N 21/2402; H04N 21/44004; H04N 21/816
See application file for complete search history.

(56) References Cited

U.S. PATENT DOCUMENTS

| | | | |
|---|---|---|---|
| 11,415,935 B2 * | 8/2022 | Hornstein | ............ H04N 13/302 |
| 2010/0149610 A1 | 6/2010 | Schwerdtner et al. | |
| 2018/0020204 A1 * | 1/2018 | Pang | ...................... H04N 23/90 |
| 2018/0035134 A1 * | 2/2018 | Pang | ................... H04N 13/117 |
| 2019/0199993 A1 | 6/2019 | Babu et al. | |
| 2019/0370926 A1 | 12/2019 | Hagland | |
| 2020/0142354 A1 | 5/2020 | Dhawan et al. | |
| 2020/0382796 A1 | 12/2020 | Wang | |
| 2021/0116864 A1 * | 4/2021 | Hornstein | ............ H04N 17/002 |
| 2021/0385463 A1 * | 12/2021 | Guruva Reddiar | .. H04N 19/179 |

* cited by examiner

*Primary Examiner* — Yassin Alata
(74) *Attorney, Agent, or Firm* — Sughrue Mion, PLLC (57) ABSTRACT

A method and apparatus for controlling lightfield and/or holographic media to be streamed to a client, determining a bandwidth based on a status of a client buffer, splitting the scene of the lightfield and/or holographic media, determining whether the assets are present in the client buffer, mapping the assets to respective ones of the split scenes and to the client buffer, controlling a transmission assets to the client buffer based on the bandwidth, the mapping, and whether one or more of the assets are determined to be present in the client buffer, and controlling the client to reuse at least one of the assets when rendering at least one of the split scenes.

20 Claims, 6 Drawing Sheets

ASSET REUSABILITY FOR LIGHTFIELD/HOLOGRAPHIC MEDIA

CROSS REFERENCE TO RELATED APPLICATION

The present application claims priority to U.S. provisional application 63/275,789 which was filed on Nov. 4, 2021, the contents of which being incorporated by reference herein in its entirety.

FIELD

The disclosed subject matter relates to methodology for storing asset in client buffer for reusability in lightfield and/or holographic displays.

BACKGROUND

Immersive media is defined by immersive technologies that attempt to create, or imitate the physical world through digital simulation, thereby simulating any or all human sensory systems to create the perception of the user being physically present inside the scene.

There are different types of immersive media technologies currently in play: Virtual Reality (VR), Augmented Reality (AR), Mixed Reality (MR), Lightfield/Holographic, etc. VR refers to a digital environment replacing the user's physical environment by using a headset to place the user in a computer-generated world. AR, on the other hand, takes digital media and layers them on the real world around the user by using either a clear vision, headset, glasses, etc., or a smartphone. MR refers to the blending of the real world with the digital world, thereby creating an environment in which technology and the physical world can co-exist.

Lightfield and/or holographic technologies consist of light rays in 3D space with rays coming from each point and direction. This is based on the concept that everything seen around is illuminated by light coming from any source, traveling via space and hitting the object's surface where the light is partly absorbed and partly reflected to another surface before reaching our eyes. Having a light field properly reproduced will provide the user with 3D effects such as binocularity and continuous motion parallax. The underlying concept beneath lightfield and/or holographic displays is the massive array of projection modules projecting light rays onto a holographic screen to reproduce the approximation of the lightfield and/or holographic by showing different but consistent information in slightly different directions.

Light rays may be defined by five-dimensional plenoptic functions, where each ray may be defined by three coordinates in 3D space (3 dimensions) and two angles to specific the direction in 3D space.

To capture the content for 360-degree video, a 360-degree camera is required; however, when it comes to capturing content for lightfield and/or holographic displays, an expensive setup comprising of multiple depth cameras or an array of cameras is required depending on the FoV of the scene to be rendered.

A traditional camera can only capture a 2D representation of the light rays that reach the camera lens at a given position. The image sensor records the sum of the brightness and color of all light rays reaching each pixel.

When it comes to capturing content for lightfield and/or holographic displays, a light field camera has been required, which can capture not only the brightness and color but also the direction of all light rays reaching the camera sensors. Using this information, a digital scene may be reconstructed with an accurate representation of the origin of each light ray, making it possible to reconstruct the exact captured scene digitally in 3D.

Currently, two primary techniques are used to capture such volumetric scenes. The first of those techniques uses an array of cameras or camera modules to capture different rays/views from each direction respective to ones of the cameras of the array or to ones of the camera modules. The second of those techniques uses a depth camera that can capture 3D information in a single exposure, without needing structured illumination, by measuring the depth of multiple objects under controlled lighting conditions.

The multimedia content for such lightfield and/or holographic displays is captured and stored in a server. This may be real-world or synthetic content. To transmit this data over to the end client requires a massive amount of bandwidth even after the data is compressed. Therefore, in situations when the bandwidth is limited, the client may experience buffering or interruptions, making the experience unpleasant. This is a technical problem which is addressed by technical solutions described throughout this application.

That is, existing computer technology is technically deficient due to data storage and transmission constraints that may be experienced from massive bandwidth requirements in the context of handling multimedia content for lightfield and/or holographic displays. Therefore, this is a desire for a technical solution to such problems. And as such, the present application discloses addresses that computer technology by improving asset storage and transmission capabilities faced by a buffer, such as a client buffer, via, for example, reusability in any of lightfield and/or holographic displays.

SUMMARY

There is included a method and apparatus comprising memory configured to store computer program code and a hardware processor or processors configured to access the computer program code and operate as instructed by the computer program code comprising controlling code configured to cause the at least one hardware processor to control a scene of a lightfield and/or holographic media to be streamed to a client, determining code configured to cause the at least one hardware processor to determine a bandwidth, available to the client for streaming the lightfield and/or holographic media, based at least on a status of a client buffer associated with the client, splitting code configured to cause the at least one hardware processor to split the scene of the lightfield and/or holographic media into a plurality of split scenes, each split scene comprising one or more assets of the scene, further determining code configured to cause the at least one hardware processor to determine whether the one or more of the assets are present in the client buffer, mapping code configured to cause the at least one hardware processor to map the one or more of the assets of the scene to respective split scenes based on whether the one or more of the assets are determined to be present in the client buffer, transmission controlling code configured to cause the at least one hardware processor to control a transmission of a subset of the one or more assets to the client buffer based on the bandwidth, the mapping, and whether the one or more of the assets are determined to be present in the client buffer, and reusability controlling code configured to cause the at least one hardware processor to control the client to reuse at least one of the assets when rendering at least one of the split scenes.

According to exemplary embodiments, the at least one hardware processor is of a server that is in a networked communication with the client.

According to exemplary embodiments, the computer program code further includes tracking code configured to cause the at least one hardware processor to track which of the assets are sent to the client device for each of a predecessor and successive ones of the split scenes.

According to exemplary embodiments, the at least one hardware processor is of the client.

According to exemplary embodiments, controlling the transmission of the ones of the one or more of the plurality of assets to the client buffer is further based on relative depths of the assets in the scene of the lightfield and/or holographic media.

According to exemplary embodiments, controlling the transmission of the ones of the one or more of the plurality of assets to the client buffer is further based on relative priorities of the assets in the scene of the lightfield and/or holographic media.

According to exemplary embodiments, determining whether one or more of the assets are present in the client buffer further comprises determining whether the one or more of the assets are present in any of a plurality of client buffers, including the client buffer, each networked on a local area network (LAN).

According to exemplary embodiments, the computer program code further includes assigning code configured to cause the at least one hardware processor to assign the at least one of the assets a re-usability priority based on at least one of how many times the at least one of the assets appears in the scene.

According to exemplary embodiments, controlling the client to reuse the at least one of the assets when rendering the at least one of the split scenes is based on the re-usability priority assigned to the at least one of the assets.

According to exemplary embodiments, assigning the at least one of the assets the re-usability priority is further based on at least one of a size of the at least one of the assets and a complexity of the at least one of the assets.

DETAILED DESCRIPTION

Figure 1:
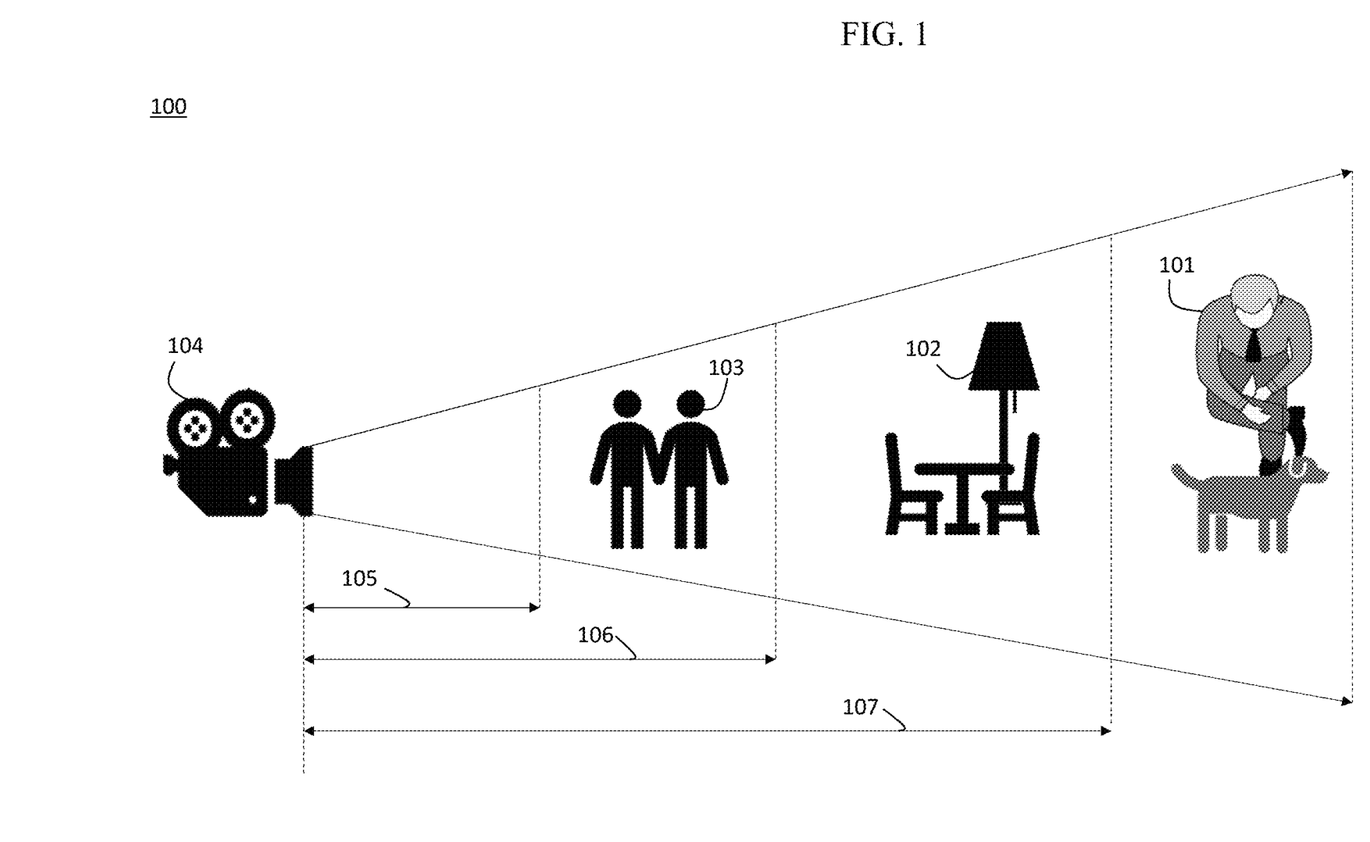
FIG. 1 is a diagram illustrating depth-based streaming according to exemplary embodiments described herein.
Figure 2:
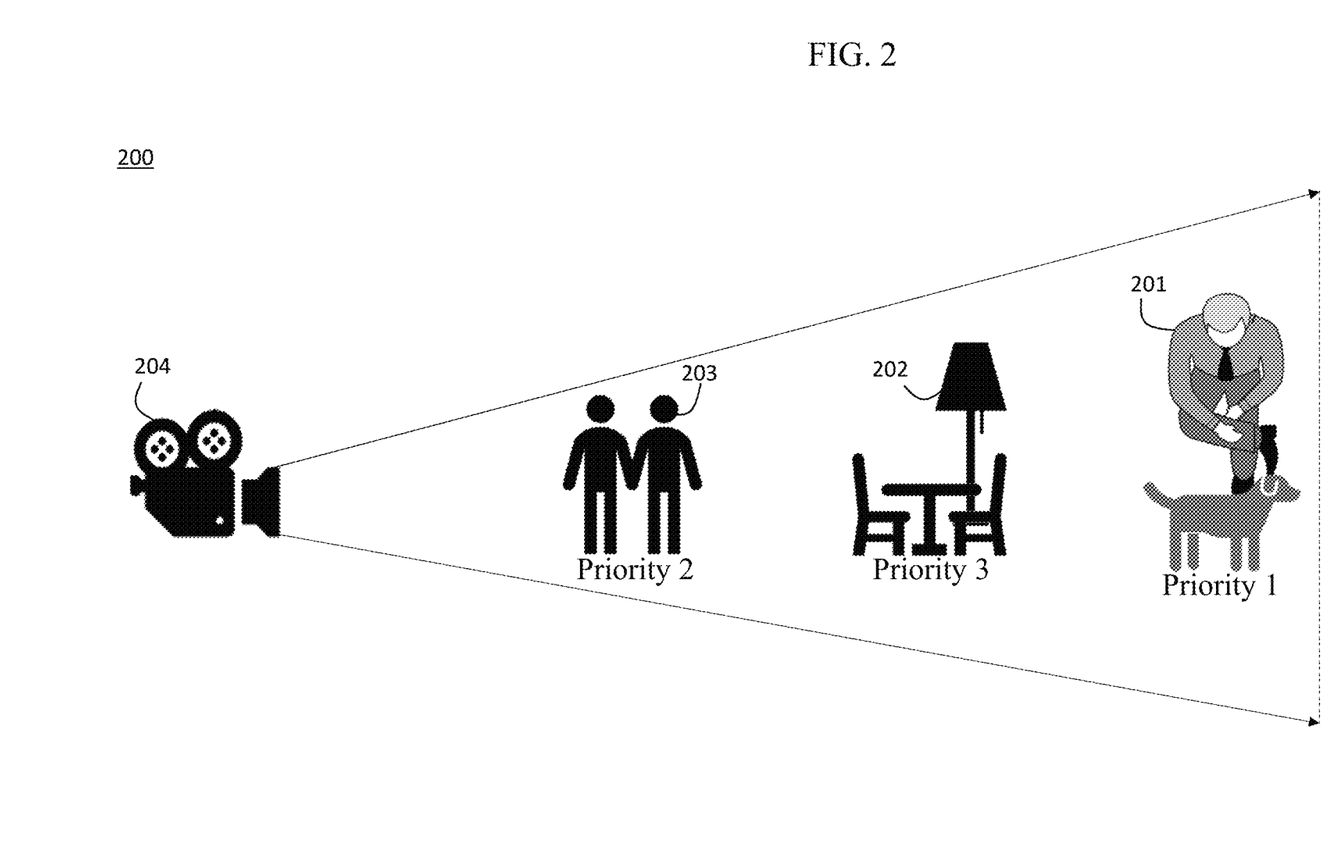
FIG. 2 is a diagram illustrating asset priority-based streaming according to exemplary embodiments described herein.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium. In the present disclosure, most probable mode (MPM) can refer to a primary MPM, a secondary MPM, or both a primary and a secondary MPM.

lightfield and/or holographic technology aims to create a virtual environment with an accurate sense of depth and three-dimensionality without the need to use any headset and therefore avoid side effects like motion sickness. The server may use depth-based adaptive streaming for lightfield and/or holographic display. Here, instead of rendering the entire scene at once, a bandwidth-based depth approach is considered according to exemplary embodiments. When the network's capacity is relatively ideal, the end client can receive and render the entire scene at once. However, when bandwidth is a limitation, the end client, instead of rendering the entire scene, renders the scene to a certain depth. This depth is a function of the client's bandwidth. Hence, after getting information about the end client's bandwidth, the server adjusts the media being streamed between scenes with varying depth. Refer to FIG. 1, showing an example 100 of depth based streaming, where object 101, object 102, and object 103 are different objects in a scene at ones of respectively varied distance 107, distance 106, and distance 105 from the camera 104, which may represent a point of view of the user. The server, after obtaining media such as at S601 in the example 600 in FIG. 6, may also, at S602, assign a priority value to each asset and use this priority value for adaptive streaming for lightfield and/or holographic display. Here, instead of rendering the entire scene at once, a bandwidth-based asset priority approach is considered according to exemplary embodiments. When the network's capacity is not limited, the end client can receive and render the entire scene assets at once. However, when bandwidth is a limitation, such as determined at S603, the end client renders assets, such as by determining adjustment at S604 and to consider priority at S606, with higher priority instead of rendering all assets in a scene. Therefore, the total assets rendered are a function of the client's bandwidth. Refer to FIG. 2, showing an example of asset priority-based streaming 200, where asset 201, asset 202, and asset 203 are different assets at varying distances, which may be considered at either S605 where it may be determined whether to consider which distances to render and or at S606 to consider which pre-set object priorities to transmit to a client and/or render at the client, from the camera 204, which may be a user's point of view, with priorities 1, 3, and 2, respectively.

Figure 6:
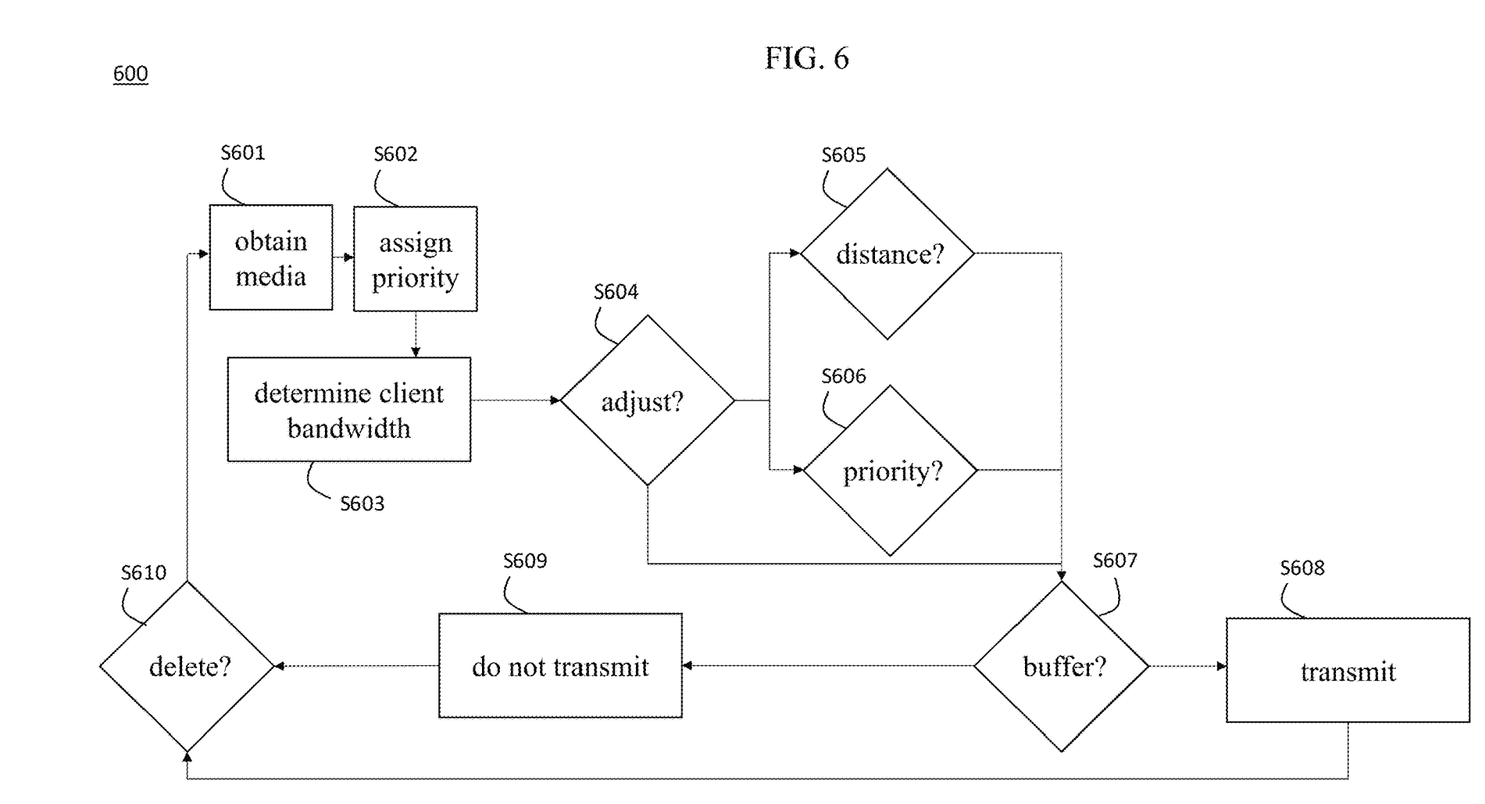
FIG. 6 is a flow diagram according to exemplary embodiments.

In an embodiment, while a scene a being streamed, assets may be kept in the client's buffer for reusability for the successive scenes. The assets may be added or removed from the client's buffer, such as at S610, based on different parameters such as those described below according to exemplary embodiments.

In an embodiment, when the lightfield and/or holographic scene is split into multiple scenes, asset mapping is done. This is done by keeping track of assets sent in the previous scene and only sending assets in the successive scenes which are not present in the preceding scenes. The asset control may either be done by the server or the client depending on the methodology being used according to exemplary embodiments.

Figure 3:
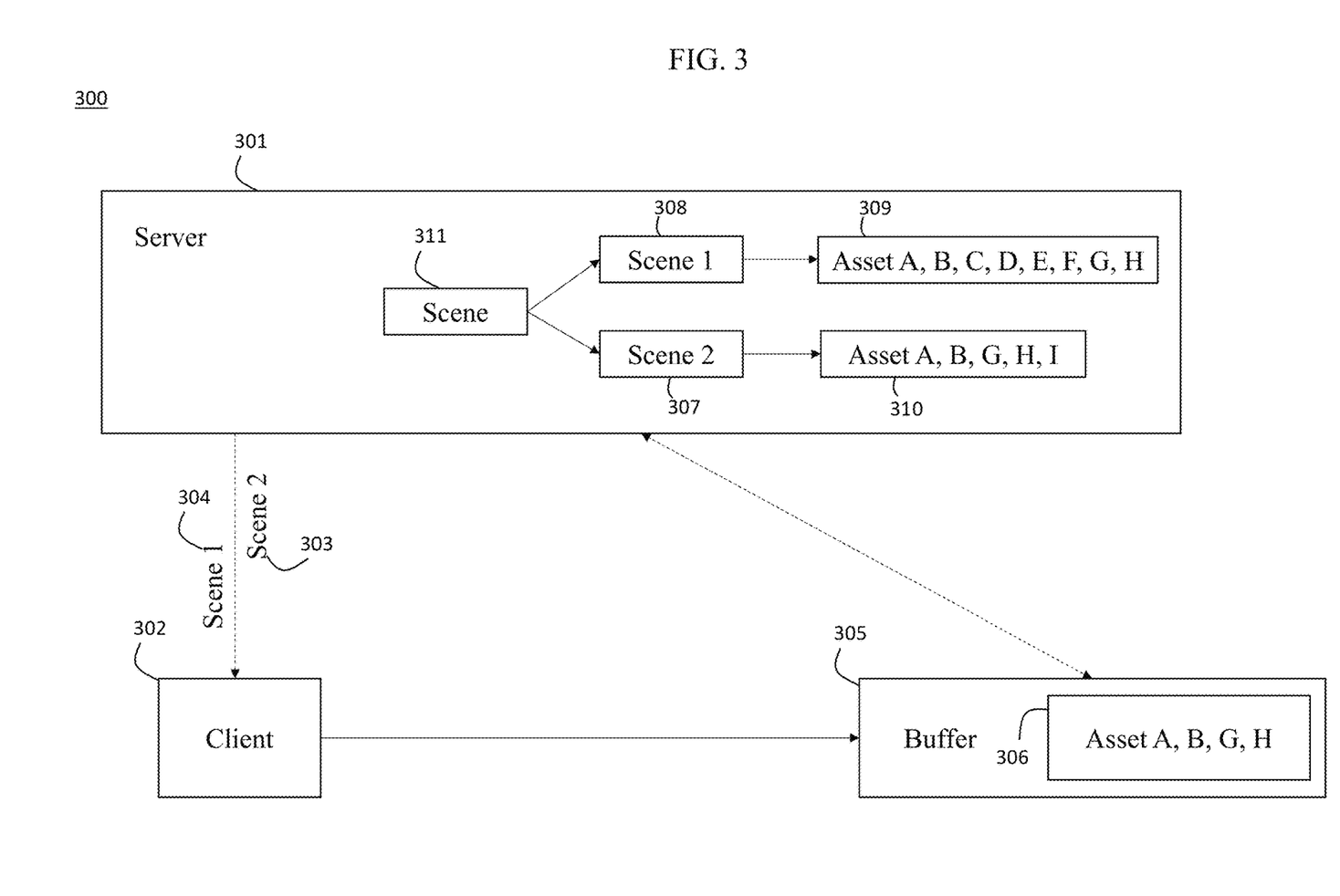
FIG. 3 is a diagram illustrating a server-controlled buffer according to exemplary embodiments described herein.

In the same or another embodiment, when the asset buffer is controlled by the server, the server while splitting a scene into multiple scenes would track the assets sent in the predecessor and successive scenes. Therefore, once the first scene is sent by the server, the server would keep a track of the assets which are in the client's buffer, by checking at S607, and would only send at S608, assets which are not already present in the client's buffer and not, at S609, others of the assets already at that buffer. The server would also maintain the assets in the client buffer such that the addition and deletion of the assets would be maintained by the server. For example, refer to FIG. 3, showing an example 300 of server controlled buffering, where the server 301 splits the scene 311 into two scenes 307 and 308 with respective assets "Scene 1" 309 and "Scene 2" 310. The client 302 streams "Scene 1" 304 and "Scene 2" 303 and the reusable assets 306 are stored in the client's buffer 305 which is controlled by the server 301.

Figure 4:
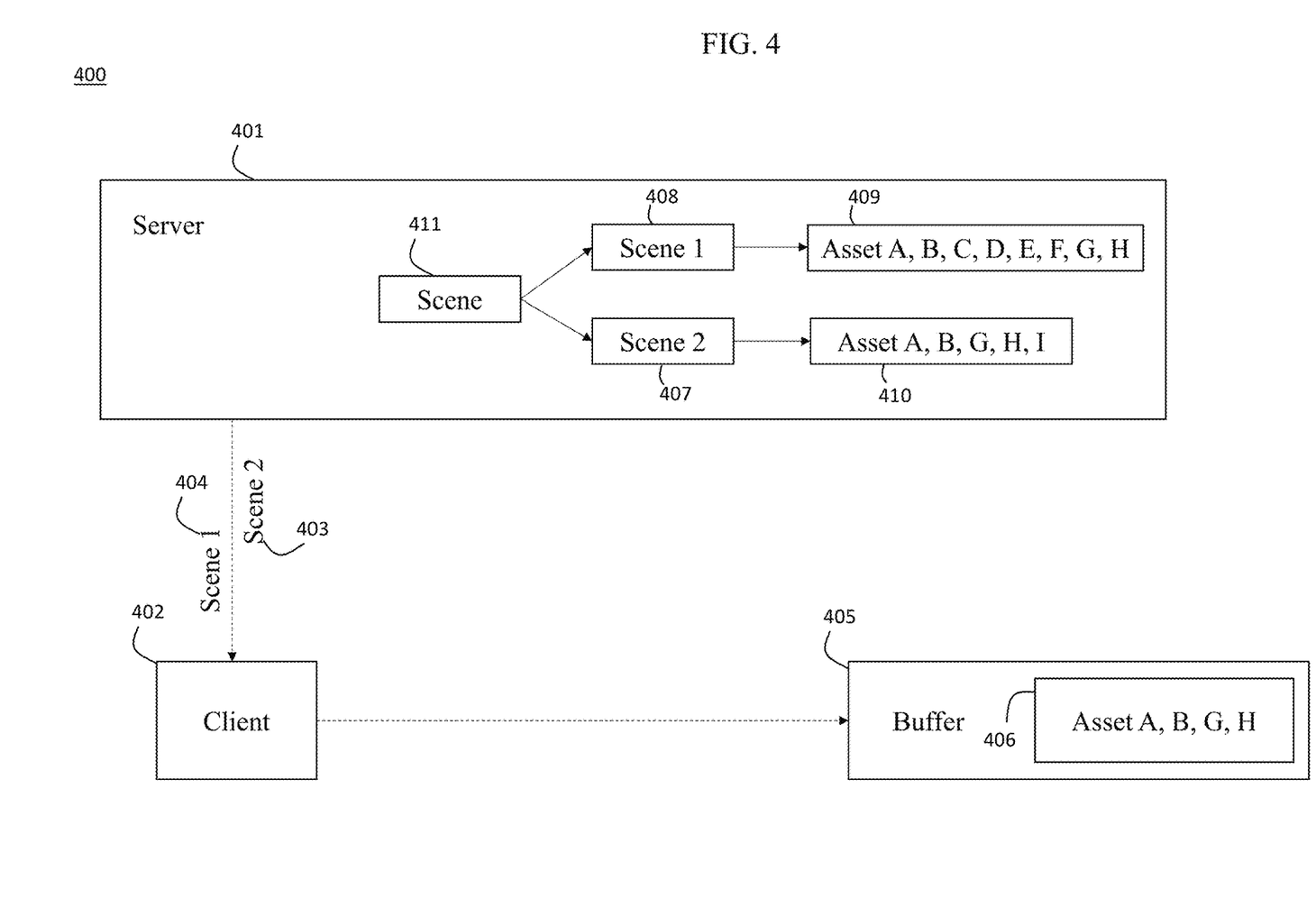
FIG. 4 is a diagram illustrating a client-controlled buffer according to exemplary embodiments described herein.

In the same or another embodiment, when the asset buffer is controlled by the client, the client decides what assets should be in the buffer. In such case, the client would send the server the list of all the assets in its buffer. The client may also send the server the list of assets which are added or deleted in the buffer. For example, refer to FIG. 4, showing an example 400 of client controlled buffering, where the server 401 splits the scene 411 into two scenes 407 and 408 with respective assets "Scene 1" 409 and "Scene 2" 410. The client 402 streams "Scene 1" 404 and "Scene 2" 403 and the reusable assets 406 are stored in the client's buffer 405 which is controlled by the client 401.

In another embodiment different strategies may be used to strategize the storage of assets. Depth based or priority-based methodology may be used. For both, priority-based storage and deletion may be used. All assets are not deleted at a time, instead asset with least priority is deleted first and so forward.

In another embodiment, assets sharing may be done on the LAN. This is applicable when multiple devices in the LAN are streaming the same media. In this case, different devices in the network may be able to co-ordinate with each to share different assets in with each other.

In the same or another embodiment, assets may also be stored in the buffer based on re-usability priority. Therefore, a priority will be assigned to all assets based on how many times the asset appears in the respective scene. Assets appearing in such scene the most may be assigned a highest priority and assets appearing the least with lowest priority. Asset priority may also be based on a size of assets. Assets with more complexity may be given a higher priority as compared to the less complex assets.

The techniques for asset reusability for lightfield and/or holographic media, described above, can be implemented as computer software using computer-readable instructions and physically stored in one or more computer-readable media. For example, FIG. 5 shows a computer system 500 suitable for implementing certain embodiments of the disclosed subject matter.

The computer software can be coded using any suitable machine code or computer language that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 5:
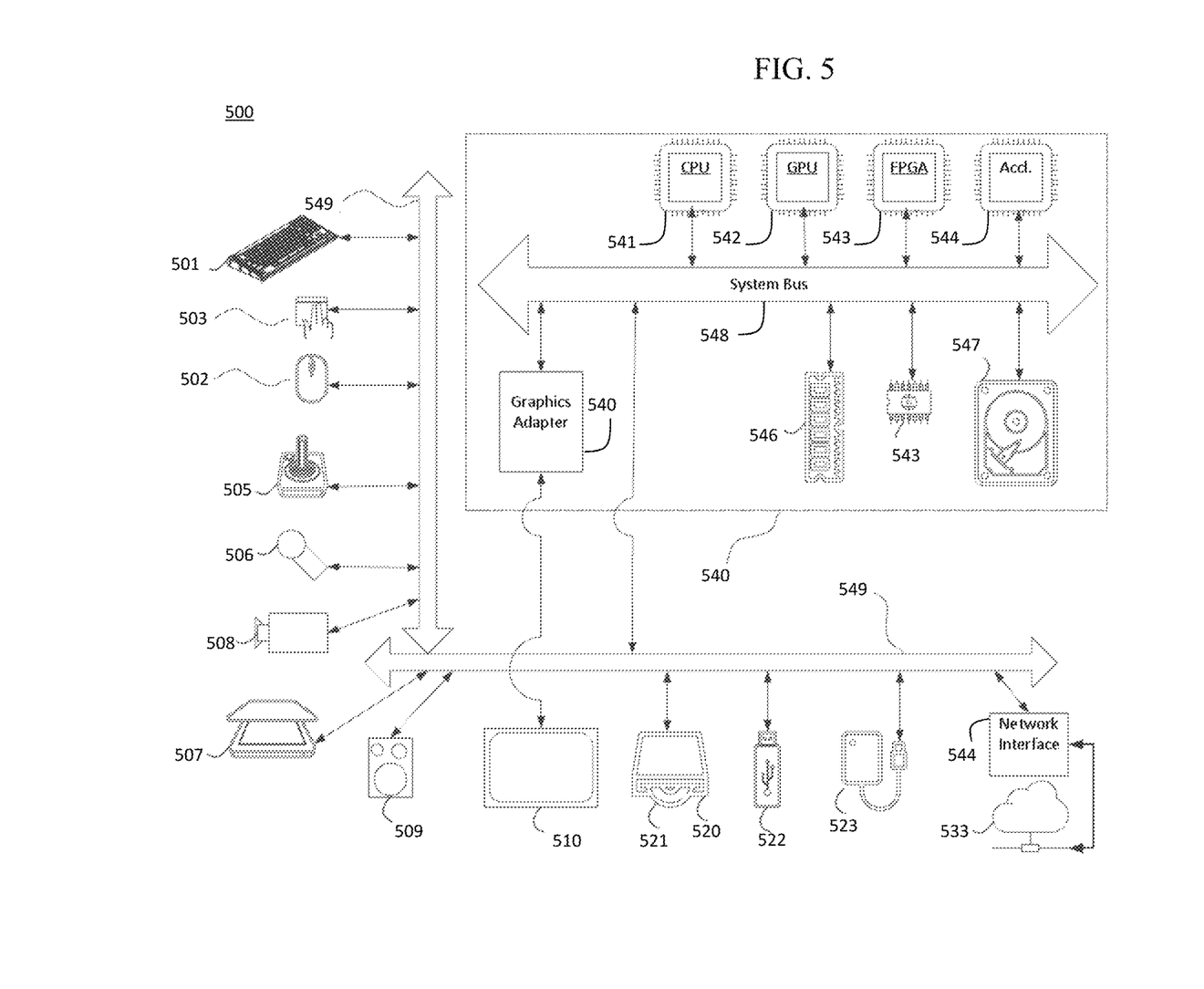
FIG. 5 is a diagram illustrating a computer system according to exemplary embodiments described herein.

The components are shown in FIG. 5 for computer system 500 are exemplary and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 500.

Computer system 500 may include certain human interface input devices. Such a human interface input device may be responsive to input by one or more human users through, for example, tactile input (such as keystrokes, swipes, data glove movements), audio input (such as voice, clapping), visual input (such as gestures), olfactory input (not depicted). The human interface devices can also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

Input human interface devices may include one or more of (only one of each depicted): keyboard 501, mouse 502, trackpad 503, touch screen 510, data-glove (not depicted), joystick 505, microphone 506, scanner 507, camera 508.

Computer system 500 may also include certain human interface output devices. Such human interface output devices may be stimulating the senses of one or more human users through, for example, tactile output, sound, light, and smell/taste. Such human interface output devices may include tactile output devices (for example, tactile feedback by the touch-screen 510, data-glove (not depicted), or joystick 505, but there can also be tactile feedback devices that do not serve as input devices), audio output devices (such as speakers 509, headphones (not depicted)), visual output devices (such as screens 510 to include CRT screens, LCD screens, plasma screens, OLED screens, each with or without touch-screen input capability, each with or without tactile feedback capability—some of which may be capable to output two-dimensional visual output or more than three-dimensional output through means such as stereographic output; virtual-reality glasses (not depicted), holographic displays and smoke tanks (not depicted)), and printers (not depicted).

Computer system 500 can also include human accessible storage devices and their associated media such as optical media including CD/DVD ROM/RW Z20 with CD/DVD or the like media 521, thumb-drive 522, removable hard drive or solid-state drive 523, legacy magnetic media such as tape and floppy disc (not depicted), specialized ROM/ASIC/PLD based devices such as security dongles (not depicted), and the like.

Those skilled in the art should also understand that term "computer-readable media" as used in connection with the presently disclosed subject matter does not encompass transmission media, carrier waves, or other transitory signals.

Computer system 500 can also include an interface to one or more communication networks. Networks can, for example, be wireless, wireline, optical. Networks can further be local, wide-area, metropolitan, vehicular, and industrial, real-time, delay-tolerant, and so on. Examples of networks include local area networks such as Ethernet, wireless LANs, cellular networks to include GSM, 3G, 4G, 5G, LTE, and the like, TV wireline or wireless wide-area digital networks to include cable TV, satellite TV, and terrestrial broadcast TV, vehicular and industrial to include CANBus, and so forth. Certain networks commonly require external network interface adapters that are attached to certain general-purpose data ports or peripheral buses (549) (such as, for example, USB ports of the computer system 500; others are commonly integrated into the core of the computer system 500 by attachment to a system bus as described below (for example Ethernet interface into a PC computer system or cellular network interface into a smartphone computer system). Using any of these networks, the computer system 500 can communicate with other entities. Such communication can be uni-directional, receive only (for example, broadcast TV), uni-directional send-only (for example, CANbus to certain CANbus devices), or bi-directional, for example, to other computer systems using local or wide area digital networks. Certain protocols and protocol stacks can be used on each of those networks and network interfaces, as described above.

The aforementioned human interface devices, human-accessible storage devices, and network interfaces can be attached to a core 540 of the computer system 500.

The core 540 can include one or more Central Processing Units (CPU) 541, Graphics Processing Units (GPU) 542, specialized programmable processing units in the form of Field Programmable Gate Areas (FPGA) 543, hardware accelerators for certain tasks 544, and so forth. These devices, along with Read-only memory (ROM) 545, Random-access memory 546, internal mass storage such as internal non-user accessible hard drives, SSDs, and the like 547, may be connected through a system bus 548. In some computer systems, the system bus 548 can be accessible in the form of one or more physical plugs to enable extensions by additional CPUs, GPU, and the like. The peripheral devices can be attached either directly to the core's system bus 548 or through a peripheral bus 549. Architectures for a peripheral bus include PCI, USB, and the like.

CPUs 541, GPUs 542, FPGAs 543, and accelerators 544 can execute certain instructions that, in combination, can make up the aforementioned computer code. That computer code can be stored in ROM 545 or RAM 546. Transitional data can also be stored in RAM 546, whereas permanent data can be stored, for example, in the internal mass storage 547. Fast storage and retrieval to any of the memory devices can be enabled through the use of cache memory, which can be closely associated with one or more CPU 541, GPU 542, mass storage 547, ROM 545, RAM 546, and the like.

The computer-readable media can have computer code thereon for performing various computer-implemented operations. The media and computer code can be specially designed and constructed for the purposes of the present disclosure, or they can be of the kind well known and available to those having skill in the computer software arts.

As an example, and not by way of limitation, the computer system having architecture 500, and specifically the core 540, can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 540 that are of non-transitory nature, such as core-internal mass storage 547 or ROM 545. The software implementing various embodiments of the present disclosure can be stored in such devices and executed by core 540. A computer-readable medium can include one or more memory devices or chips, according to particular needs. The software can cause the core 540 and specifically the processors therein (including CPU, GPU, FPGA, and the like) to execute particular processes or particular parts of particular processes described herein, including defining data structures stored in RAM 546 and modifying such data structures according to the processes defined by the software. In addition, or as an alternative, the computer system can provide functionality as a result of logic hardwired or otherwise embodied in a circuit (for example, accelerator 544), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method, implemented by at least one hardware processor, comprising:
controlling a scene of a lightfield or holographic media to be streamed to a client;
determining a bandwidth, available to the client for streaming the lightfield or holographic media, based at least on a status of a client buffer associated with the client;
splitting the scene of the lightfield or holographic media into a plurality of split scenes, each split scene comprising one or more assets of the scene;
determining whether the one or more of the assets are present in the client buffer;
mapping the one or more of the assets of the scene to respective split scenes based on whether the one or more of the assets are determined to present in the client buffer;
controlling a transmission of a subset of the one or more assets to the client buffer based on the bandwidth, the mapping, and whether the one or more of the assets are determined to be present in the client buffer; and
controlling the client to reuse at least one of the assets when rendering at least one of the split scenes.

2. The method according to claim 1, wherein the at least one hardware processor is of a server that is in a networked communication with the client.

3. The method according to claim 2, further comprising:
tracking which of the assets are sent to the client device for each of a predecessor and successive ones of the split scenes.

4. The method according to claim 1, wherein the at least one hardware processor is of the client.

5. The method according to claim 1, wherein controlling the transmission of the ones of the one or more of the plurality of assets to the client buffer is further based on relative depths of the assets in the scene of the lightfield or holographic media.

6. The method according to claim 1, wherein controlling the transmission of the ones of the one or more of the assets to the client buffer is further based on relative priorities of the assets in the scene of the lightfield or holographic media.

7. The method according to claim 1, wherein determining whether the one or more of the assets are present in the client buffer further comprises determining whether the one or more of the assets are present in any of a plurality of client buffers, including the client buffer, each networked on a local area network (LAN).

8. The method of according to claim 1, further comprising assigning the at least one of the assets a re-usability priority based on at least one of how many times the at least one of the assets appears in the scene.

9. The method of according to claim 8, wherein controlling the client to reuse the at least one of the assets when rendering the at least one of the split scenes is based on the re-usability priority assigned to the at least one of the assets.

10. The method according to claim 9, wherein assigning the at least one of the assets the re-usability priority is further based on at least one of a size of the at least one of the assets and a complexity of the at least one of the assets.

11. An apparatus comprising:
at least one memory configured to store computer program code;
at least one hardware processor configured to access the computer program code and operate as instructed by the computer program code, the computer program code including:
controlling code configured to cause the at least one hardware processor to control a scene of a lightfield or holographic media to be streamed to a client;
determining code configured to cause the at least one hardware processor to determine a bandwidth, available to the client for streaming the lightfield or holographic media, based at least on a status of a client buffer associated with client;
splitting code configured to cause the at least one hardware processor to split the scene of the lightfield or holographic media into a plurality of split scenes each split scene comprising one or more assets of the scene;
further determining code configured to cause the at least one hardware processor to determine whether the one or more of the assets are present in the client buffer;
mapping code configured to cause the at least one hardware processor to map the one or more of the assets of the scene to respective split scenes and based on whether one or more of the assets are determined to be present in the client buffer;
transmission controlling code configured to cause the at least one hardware processor to control a transmission of a subset of the one or more assets to the client buffer based on the bandwidth, the mapping, and whether the one or more of the assets are present in the client buffer; and
reusability controlling code configured to cause the at least one hardware processor to control the client to reuse at least one of the assets when rendering at least one of the split scenes.

12. The apparatus according to claim 11, wherein the at least one hardware processor is of a server that is in a networked communication with the client.

13. The apparatus according to claim 12, wherein the computer program code further includes tracking code configured to cause the at least one hardware processor to track which of the assets are sent to the client device for each of a predecessor and successive ones of the split scenes.

14. The apparatus according to claim 11, wherein the at least one hardware processor is of the client.

15. The apparatus according to claim 11, wherein controlling the transmission of the ones of the one or more of the plurality of assets to the client buffer is further based on relative depths of the assets in the scene of the lightfield or holographic media.

16. The apparatus according to claim 11, wherein controlling the transmission of the ones of the one or more of the plurality of assets to the client buffer is further based on relative priorities of the assets in the scene of the lightfield or holographic media.

17. The apparatus according to claim 11, wherein determining whether the one or more of the assets are present in the client buffer further comprises determining whether the one or more of the assets are present in any of a plurality of client buffers, including the client buffer, each networked on a local area network (LAN).

18. The apparatus of according to claim 11, wherein the computer program code further includes assigning code configured to cause the at least one hardware processor to assign the at least one of the assets a re-usability priority based on at least one of how many times the at least one of the assets appears in the scene, a size of the at least one of the assets, and a complexity of the at least one of the assets.

19. The apparatus of according to claim 11, wherein controlling the client to reuse the at least one of the assets when rendering the at least one of the split scenes is based on the re-usability priority assigned to the at least one of the assets.

20. A non-transitory computer readable medium storing a program causing a computer to execute a process, the process comprising:
controlling a scene of a lightfield or holographic media to be streamed to a client;
determining a bandwidth, available to the client for streaming the lightfield or holographic media, based at least on a status of a client buffer associated with the client;
splitting the scene of the lightfield or holographic media into a plurality of split scenes, each split scene comprising one or more assets of the scene;
determining whether the one or more of the assets are present in the client buffer;
mapping the one or more of the assets of the scene to respective split scenes based on a whether the one or more of the assets are determined to present in the client buffer;
controlling a transmission of a subset of the one or more assets to the client buffer based on the bandwidth, the mapping, and whether the one or more of the assets are determined to be present in the client buffer; and
controlling the client to reuse at least one of the assets when rendering at least one of the split scenes.

* * * * *